United States Patent [19]

Tanaka

[11] Patent Number: 4,558,354
[45] Date of Patent: Dec. 10, 1985

[54] DELAY CIRCUIT

[75] Inventor: Sadaaki Tanaka, Hatano, Japan

[73] Assignee: Sony Corporation, Tokyo, Japan

[21] Appl. No.: 521,363

[22] Filed: Aug. 8, 1983

[30] Foreign Application Priority Data

Aug. 10, 1982 [JP] Japan ................................ 57-137863

[51] Int. Cl.[4] ............................................. H04N 5/14
[52] U.S. Cl. .................................... 358/37; 358/162; 358/166
[58] Field of Search ................. 358/21 R, 37, 39, 162, 358/166; 329/50

[56] References Cited

U.S. PATENT DOCUMENTS

| | | | |
|---|---|---|---|
| 3,732,360 | 5/1973 | Breimer et al. | 358/37 |
| 3,743,766 | 7/1973 | Loose et al. | 358/37 |
| 3,780,215 | 12/1973 | Shibata | 358/37 |
| 4,291,330 | 9/1981 | Hirai | 358/39 |
| 4,481,537 | 11/1984 | Tanaka | 358/162 |

Primary Examiner—Michael A. Masinick

Attorney, Agent, or Firm—Lewis H. Eslinger; Alvin Sinderbrand

[57] ABSTRACT

A delay circuit, which comprises modulators for effecting contour modulation of an input video signal using a signal from a carrier oscillator as a carrier, delay circuit for delaying the modulation output of the modulators, variable phase shifter for phase shifting the carrier oscillator output signal, demodulators for effecting demodulation by synchronous detection using the output of the variable phase shifter as a synchronizing signal, adder for superimposing a reference signal on a first demodulation of signal from the demodulator corresponding to a first input signal to the modulator and supplying the resultant signal as a second input signal to the modulator, controller for controlling the amount of phase shift by the variable phase shifter according to the reference signal demodulated by the second demodulator, wherein demodulators produce a first demodulated signal delayed behind the first input signal supplied to the modulators by an amount provided by the delay circuit and a second demodulated signal delayed behind the first input signal by double the amount.

6 Claims, 7 Drawing Figures

FIG.4
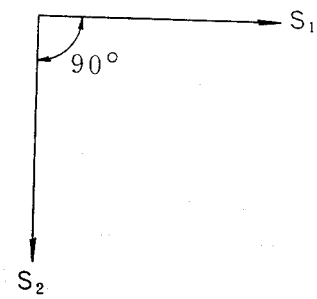
FIG.5
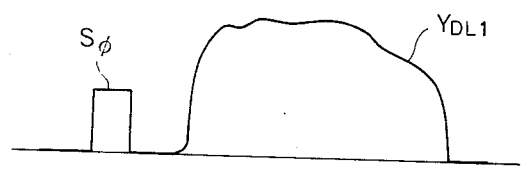
FIG.6
FIG.7
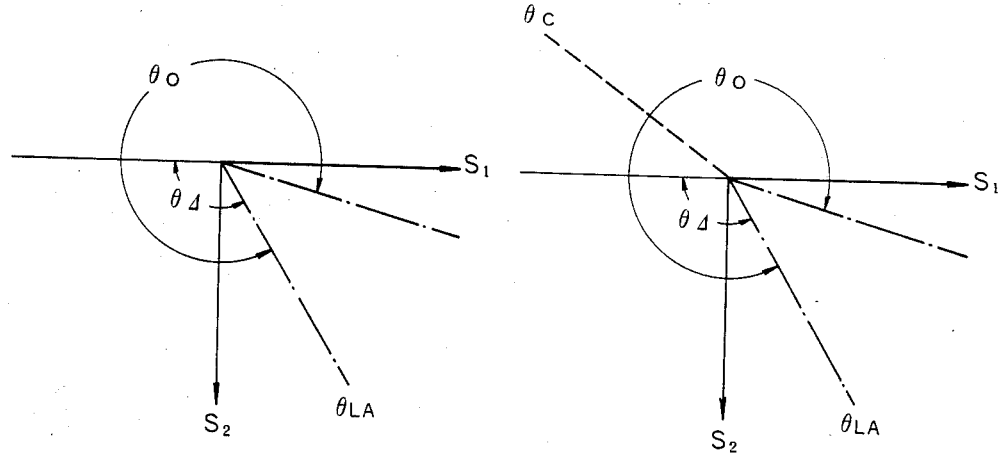

DELAY CIRCUIT

BACKGROUND OF THE INVENTION

1. Field of the Invention:

This invention relates to a delay circuit for contour compensation processing of video signals in systems such as television receivers and television cameras and, more particularly, is directed to a delay circuit using a single delay line to produce delayed output signals which are delayed by two different amounts.

2. Description of the Prior Art:

Video signals in video systems such as television receivers and television cameras pass through various electric circuits and signal transmission lines having finite operation frequency ranges. Often, high frequency component attenuation of the signal occurs, which results in a so-called reduction of resolution. By way of example, if the luminance signal contains a 3.58-MHz color subcarrier, then a 35.8-MHz beat brilliance variation result in the reproduced image. To eliminate such beat interference, the video amplifier circuit in a color television receiver has frequency characteristics such that the color subcarrier is attenuated by more than 15 to 16 dB. Therefore, through such a video amplifier circuit the high frequency components of the video signal are attenuated, which results in the reduction of the resolution of the reproduced image. In a shadow-mask type cathode ray tube, the brilliance modulation efficiency is reduced when the frequency exceeds 2 MHz. The reduction of the brilliance modulation efficiency reduces the contrast to reduce the resolution.

To compensate for such reduction of the resolution, it has been the practice to effect contour compensation processing on portions of the luminance signal waveform corresponding to the contour of the image with an overshoot or undershoot of 20 to 30%. This processing has the effect of increasing the sharpness of the contour portions of the image, thus improving the resolution.

Heretofore, a vertical contour compensation circuit 10 as shown in FIG. 1 has been broadly used for improving the resolution of the image in the vertical direction.

In the vertical contour compensation circuit 10 shown in FIG. 1, an input luminance signal $Y_{in}$, which has not been contour compensated, is coupled to a signal input terminal 1 to be fed to a delay circuit 2 and a first adder 3. The input luminance signal $Y_{in}$ has a waveform as shown, for instance, at A in FIG. 2. The delay circuit 2 produces a first delayed luminance signal $Y_{DL1}$ having a waveform as shown at B in FIG. 2, which is delayed after the input luminance signal $Y_{in}$ by one horizontal scanning period 1 H, and a second delayed luminance signal $Y_{DL2}$ having a waveform as shown at C in FIG. 2, which is delayed after the input luminance signal $Y_{in}$ by 2 H. The first delayed luminance signal $Y_{DL1}$ obtained from the delay circuit 2 is fed to a subtracter 5 and a second adder 7. The second delayed luminance signal $Y_{DL2}$, on the other hand, is fed to the first adder 3. The first adder 3 adds the input luminance signal $Y_{in}$ and the second delayed luminance signal $Y_{DL2}$ and feeds the resultant signal $Y_A$, (having a waveform as shown at D in FIG. 2,) through an attenuator 4 to the subtracter 5. The subtracter 5 subtracts the resultant signal $Y_A$ from the first delayed luminance signal $Y_{DL1}$ to obtain a contour compensation signal $S_{AC}$ having a waveform as shown at E in FIG. 2. This contour compensation signal $S_{AC}$ is fed through a level controller 6 to the second adder 7. The second adder 7 superimposes the contour compensation signal $S_{AC}$ on the first delayed luminance signal $Y_{DL1}$ and produces an output luminance signal $Y_{out}$ as shown at F in FIG. 2. The signal $Y_{out}$ appears at an output terminal 8 and has a vertical contour compensated waveform with an overshoot and an undershoot generated as a result of the superimposition of the contour compensation signal $S_{AC}$ on the luminance change portions, i.e., contour portions in the vertical direction of the image.

The delay circuit 2 in the vertical contour compensation circuit 10 usually requires two 1 H delay lines 22 and 25, each providing a delay time equal to 1 H. Referring to FIG. 1, the input luminance signal $Y_{in}$ coupled to the input terminal 1 is fed to a modulator 21 in the delay circuit 2 for amplitude modulation. The output from modulator 21 is fed to the first delay line 22. The delayed output signal from the first delay line 22 is fed through a first gain controlled amplifier 23 to a first demodulator 24. The first gain controlled amplifier 23 is gain controlled by the output of the first demodulator 24. The delayed output signal from the first delay line 22 is fed through the first gain controlled amplifier 23 to the second delay line 25. The delayed output signal from the second delay line 25 is fed through a second gain controlled amplifier 26 to a second demodulator 27.

When the input luminance signal $Y_{in}$, as shown at A in FIG. 2, is fed to the amplitude modulator 21, the first demodulator 24 demodulates the 1 H delayed luminance signal from the first delay line 22 and produces the first delayed luminance signal $Y_{DL1}$, which is delayed by 1 H behind the input luminance signal $Y_{in}$, as shown at B in FIG. 2. The second demodulator 27 demodulates the luminance signal that has been delayed by 1 H through each of the first and second delay lines 22 and 25 and produces the second delayed luminance signal $Y_{DL2}$ delayed by 2 H behind the input luminance signal $Y_{DL2}$, as shown at C in FIG. 2.

As has been shown, the delay circuit 2 in the vertical contour compensation circuit 10 according to the prior art uses two 1 H delay lines 22 and 25 in order to obtain the first and second delayed luminance signals $Y_{DL1}$ and $Y_{DL2}$ delayed by 1 H and 2 H behind the input luminance signal $Y_{in}$, respectively. Since a delay line is generally expensive, the vertical contour compensation circuit 10 using two high performance 1 H delay lines to provide a comparatively long delay time and which also has wide frequency band characteristics, is inevitably very expensive. The major proportion of the price is occupied by the delay lines 22 and 25. In a small addition, the signal level attenuation and temperature characteristics vary with individual delay lines having the same ratings and specifications. Therefore, where the two delay lines 22 and 25 are used, as in the prior art, the delayed output signals must be passed through the gain controlled amplifiers 23 and 26 for the AGC level control.

SUMMARY OF THE INVENTION

The main object of this invention is to provide a delay circuit having a novel construction, which can provide two different delay times with a single delay line.

Another object of the invention is to provide a delay circuit, which permits steady demodulation of an orthogonally modulated signal transmitted through a single delay line.

A further object of the invention is to provide a delay circuit, which permits vertical contour compensation processing, to enhance image reproduction by forming a vertical contour compensation signal from delayed luminance signals obtained from a single 1 H delay line and delayed 1 H and 2 H behind the input luminance signal, respectively.

To attain the above objects of the invention, there is provided a delay circuit, which comprises first modulating means for effecting orthogonal modulation of the first input luminance signal using a signal from the output carrier oscillator as a carrier, delaying means for delaying the modulation output of the first modulating means, variable phase shifting means for phase shifting the carrier oscillator output signal, first demodulating means for effecting demodulation by synchronous detection, using the output of the variable phase shifting means as a synchronizing signal, adding means for superimposing a reference signal on a first demodulation of the delayed output signal from the first demodulating means, corresponding to a first input luminance signal to the first modulating means, and supplying the resultant signal as a second input signal to the second modulating means, and control means for controlling the amount of phase shift by the variable phase shifting means according to the reference signal demodulated by the second demodulating means, wherein the first demodulating means produces a first demodulated signal delayed behind the first input signal supplied to the first modulating means by an amount provided by the delay means and the second demodulating means producing a second demodulated signal delayed behind the first input signal by double the amount of the delay provided by the delay means.

DESCRIPTION OF THE DRAWINGS

FIG. 4 is a vector diagram rpresentation of a first and second amplitude modulator;

FIG. 5 is a wave form diagram showing an input signal to the second amplitude modulator; and FIGS. 6 and 7 are vector diagrams showing the operation of the voltage controlled variable phase shifter in the same embodiment.

DETAILED DESCRIPTION OF THE INVENTION

Figure 1:
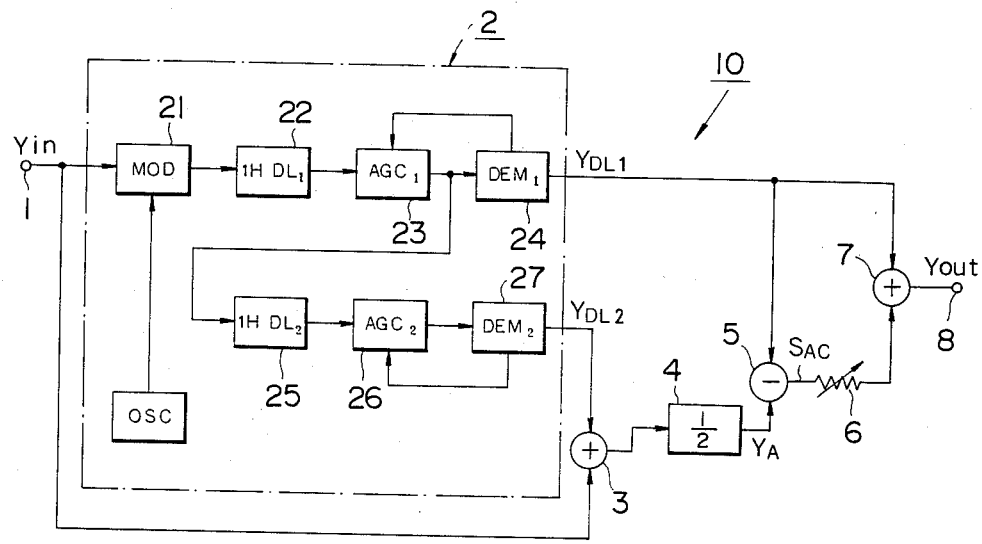
FIG. 1 is a block diagram showing the general circuit construction of a prior art vertical contour compensation circuit.
Figure 2:
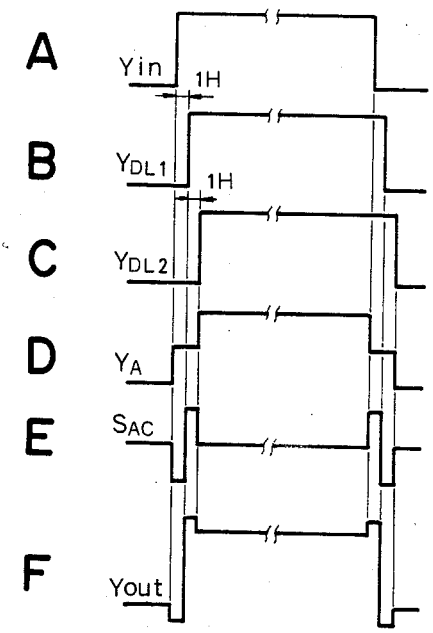
FIG. 2 is a signal waveform chart, which represents the operation of the prior art example.
Figure 3:
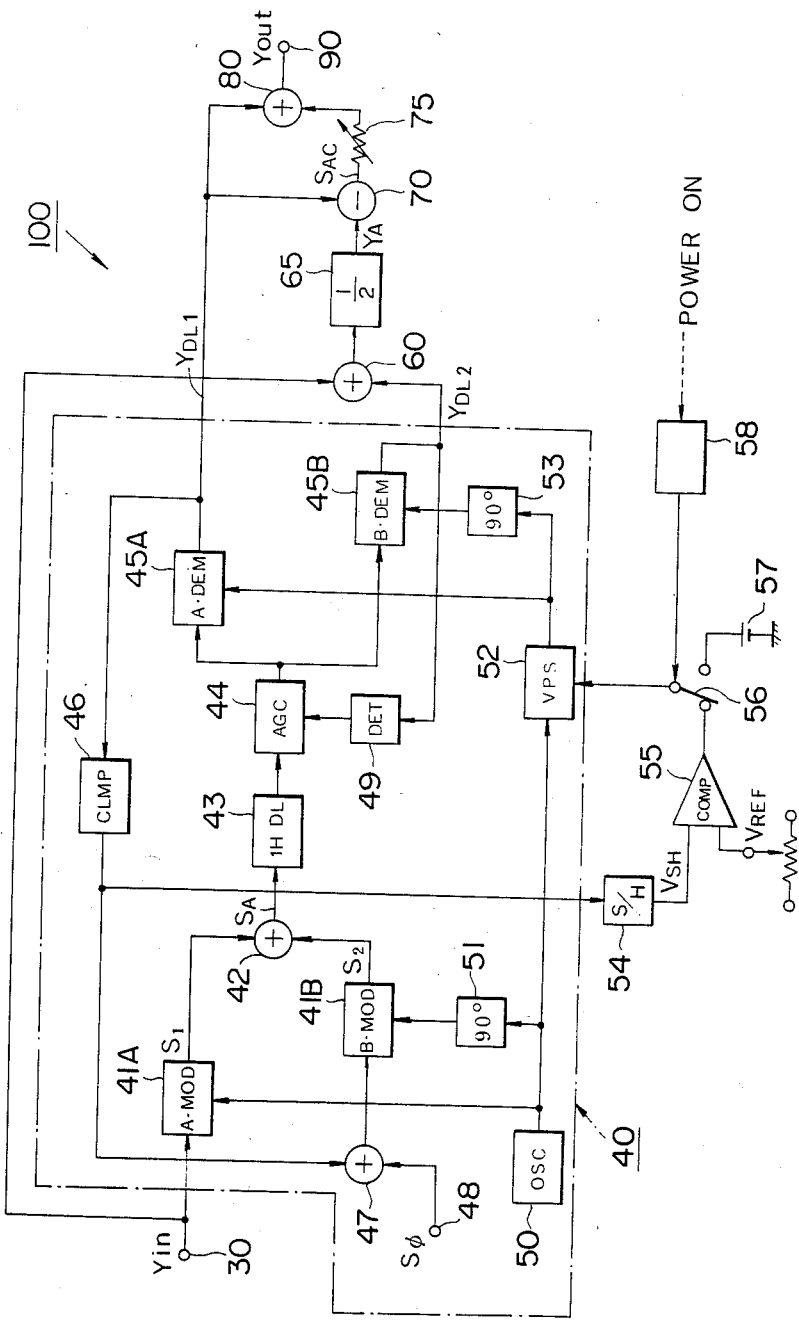
FIG. 3 is a block diagram showing an embodiment of the invention.

FIG. 3 is a block diagram showing an embodiment of the invention in a vertical contour compensation circuit.

The illustrated vertical contour compensation circuit 100 incorporates a delay circuit 40, that employs a single 1 H delay line 43 which can provide a first and second delayed luminance signal $Y_{DL1}$ and $Y_{DL2}$, respectively delayed 1 H and 2 H behind an input luminance signal $Y_{in}$. A first adder 60 adds the input luminance signal $Y_{in}$, which is coupled to an input terminal 30 and the second delayed luminance signal $Y_{DL2}$. A subtracter 70 produces a contour compensation signal $S_{AC}$ from the first delayed luminance signal $Y_{DL1}$ and the sum signal from the first adder 60. A second adder 80 adds the contour compensation signal $S_{AC}$ to the first delayed luminance signal $Y_{DL1}$ to obtain a vertical contour compensated output luminance signal $Y_{out}$.

The delay circuit 40 includes a first and a second amplitude modulator 41A and 41B for effecting commonly termed orthogonal modulation of a carrier from a carrier oscillator 50. The input luminance signal $Y_{in}$ coupled to the input terminal 30 is fed to the first amplitude modulator 41A. The carrier output signal from the carrier oscillator 50 is supplied directly to the first amplitude modulator 41A, while it is supplied to the second amplitude modulator 41B through a phase shifter 51, which shifts the phase by 90°. The orthogonal modulation thus is done with carriers 90° out of phase with each other to produce a first and second amplitude modulation $S_1$ and $S_2$ 90° out of phase with each other, as shown in the vector diagram of FIG. 4, these modulations are added together by adder 42. The resultant sum signal $S_A$ from adder 42 is fed through 1 H delay line 43 to a voltage controlled variable gain amplifier 44. The 1 H delay line 43 delays the sum signal $S_A$ by 1 H. The voltage controlled variable gain amplifier 44 effects insertion loss temperature compensation for the 1 H delay line, and it is gain controlled by the output of a reference signal detector 49, to be described later. The output of the voltage controlled variable gain amplifier 44 is fed to the first and second demodulators 45A and 45B. The carrier output signal from the carrier oscillator 50 is coupled as a synchronizing signal through a voltage controlled variable phase shifter 52 to the first and second demodulators 45A and 45B for demodulating the sum signal output from the voltage controlled variable gain amplifier 44 by synchronous detection. A phase shifter 53 provides a phase difference of 90° between synchronizing signals supplied to the demodulators 45A and 45B. The amount of phase shift by the voltage controlled variable phase shifter 52 is controlled by the output of a level comparator 55, to be described later.

The first demodulator 45A demodulates only a component of the sum signal output of the voltage controlled variable gain amplifier 44 corresponding to the first amplitude modulation $S_1$ by synchronous detection of the sum signal output. Demodulator 45A recovers the first delayed luminance signal $Y_{DL1}$, delayed 1 H behind the input luminance signal $Y_{in}$, because the sum signal output fed to it from the variable gain amplifier 44 has been delayed 1 H through the 1 H delay line 43 and the first amplitude modulation $S_1$ in the sum signal $S_A$ is the amplitude modulation of the input luminance signal $Y_{in}$ on the carrier.

The first delayed luminance signal $Y_{DL1}$ from the first demodulator 45A is fed to the subtracter 70 and second adder 80. In addition, $Y_{DL1}$ is fed through a clamp circuit 46 in the delay circuit 40 to a sample/hold circuit 54 and an adder 47. A reference signal $S\phi$, coupled to a reference signal input terminal 48, is fed to the adder 47 and is superimposed on the first delayed luminance signal $Y_{DL1}$ at a position corresponding to the blanking period as shown in FIG. 5. The output of the adder 47, consisting of the reference signal $S\phi$ and the first delayed luminance signal $Y_{DL1}$ superiposed on each other, is fed to the second amplitude modulator 41B.

The second demodulator 45B, that corresponds to the second amplitude modulator 41B, demodulates only the component of the sum signal output of the voltage controlled variable gain amplifier 44 corresponding to the second amplitude modulation $S_2$ by synchronous detection of the sum signal output. Demodulator 45B the second delayed luminance signal $Y_{DL1}$, which is delayed 1 H behind the first delayed luminance signal $Y_{DL1}$, i.e., delayed 2 H behind the input luminance signal $Y_{in}$, under the control of the reference signal $S\phi$, because the second amplitude modulation $S_2$ consists of the reference signal $S\phi$ and first delayed luminance signal $Y_{DL1}$ superimposed on each other and delayed 1 H through the 1 H delay line 43 before being fed to demodulator.

The second delayed luminance signal $Y_{DL2}$ is fed to the first adder 60 for addition to the input luminance signal $Y_{in}$. The sum signal from the first adder 60 is fed through an attenuator 65 to yield $Y_A$ and is fed to the subtracter 70. The subtracter 70 subtracts the first delayed luminance signal $Y_{DL1}$ from the sum signal $Y_A$ to obtain the contour compensation signal $S_{AC}$. The second adder 80 superimposes the contour compensation signal $S_{AC}$ on the first delayed luminance signal $Y_{DL1}$, whereby the vertical contour compensated output luminance signal $Y_{out}$ is produced from the output terminal.

In this embodiment, the reference signal detector 49 detects the reference signal $S\phi$, demodulated by the second demodulator 45B, and controls the gain of the voltage controlled variable gain amplifier 44 to make the signal level of the reference signal $S\phi$ constant. By using this automatic gain control (AGC) function, the insertion loss temperature compensation for the 1 H delay line 43 is performed by the voltage controlled variable gain amplifier 41 operating on the sum signal $S_A$ input thereto, i.e., the first and second amplitude modulations $S_1$ and $S_2$, having been delayed through the 1 H delay line 43. The first and second demodulators 45A and 45B, to which the sum signal $S_A$ is fed through the voltage controlled variable gain amplifier 44, demodulate the first delayed luminance signal $Y_{DL1}$ perfectly free from the reference signal $S\phi$ and the perfect referenced signal $S\phi$ respectively so long as the phase relation of the synchronous detection, i.e., the phase relation between the synchronizing signals, is correct.

In this embodiment, the output signal of the carrier oscillator 50 is supplied as the synchronizing signal through the voltage controlled variable phase shifter 52 to the first and second demodulators 45A and 45B. The amount of phase shift by the voltage controlled variable phase shifter 52 is controlled according to the output of the level comparator 55. More specifically, the level comparator 55 compares a reference voltage $V_{REF}$ supplied to one input terminal of it and a hold voltage $V_{SH}$ supplied from the sample/hold circuit 54. The output representing the result of comparison is fed through a signal selection switch 56 to the voltage controlled variable phase shifter 52. The sample/hold circuit 54 samples and holds the output of the clamp circuit 46 at a position corresponding to the reference signal $S\phi$ superimposed on the first delayed luminance signal $Y_{DL1}$. The level comparator 55 compares the levels of the reference voltage $V_{REF}$, which is equal to the clamp voltage of the clamp circuit 46, i.e., the first delayed luminance signal $Y_{DL1}$, and the hold voltage $V_{SH}$. The first delayed luminance signal $Y_{DL1}$, demodulated by the first demodulator does not contain any component corresponding to the second modulation $S_2$ by the second amplitude modulator 41B so long as the phase of synchronous detection by the first demodulator 45A is correct. In other words, with the correct phase of synchronous detection by the first demodulator 45A the first delayed luminance signal $Y_{DL1}$ fed to the sample/hold circuit 54 does not contain the reference signal $S\phi$ noted above. In this case, the clamp level is sampled and held by the sample/hold circuit 54. Thus, by controlling the amount of phase shift by the voltage controlled variable phase shifter 52 according to the output of the level comparator 55, which compares the hold voltage $V_{SH}$ from the sample/hold circuit 54 and the reference voltage $V_{REF}$ equal to the clamped voltage, the correct phase of the synchronizing signal supplied to the first demodulator 45A can be maintained. Also, by feeding the synchronizing signal noted above through the 90° phase shifter 53 to the second demodulator 45B, the correct phase of the synchronizing signal required for synchronous detection by the second demodulator 45B is maintained. In other words, through automatic phase control of the synchronizing signals using the voltage controlled variable phase shifter 52, the correct phases of synchronous detection by the demodulators 45A and 45B can be maintained stably and reliably irrespective of variations of the delay characteristics of the 1 H delay line 43 due to temperature changes or due to long use.

Generally, is unknown what the control state is when the automatic phase control loop is established at the time of the closure of the power source. If the phase of the synchronous detection is deviated by 180° or more at the time of the establishment of the loop, stable pull-in cannot be obtained. For example, if the phase of the synchronous detection for the first demodulator 45A is in a range indicated by $\theta_\Delta$ in FIG. 6, where the phase range of the voltage controlled variable phase shifter 52 is indicated at $\theta_0$, the automatic phase control is stopped at one limit $\theta_{LA}$ of the range $\theta_0$, and the phase can no longer be locked at the correct phase. In this embodiment, the amount of phase shift by the voltage controlled variable phase shifter 52 is tentatively fixed at the center $\theta_c$ of the phase range as shown in FIG. 7 at the time of the closure of the power source. By so doing, reliable pull-in to the correct phase can be obtained. More specifically, at the time of the closure of the power source the control voltage selection switch 56 is tentatively switched to the side of a fixed power supply 57 by a time constant circuit 58, which detects the rising of the power source voltage. The voltage of the fixed power supply 57, which is supplied as the control voltage to the voltage controlled variable phase shifter 52, is set to fix the phase amount to the center $\theta_c$. Thus control voltage selection switch 56 is switched to the side of the level comparator 55 after the lapse of a predetermined period of time determined by the time constant circuit 58. With the switching of the control voltage as described, the voltage controlled variable phase shifter 52 in the phase control loop starts the pull-in of phase from the center $\theta_c$ noted above. The synchronous detection phase can be automatically and reliably locked to the correct phase.

As has been shown, in the above embodiment the delayed luminance signals $Y_{DL1}$ and $Y_{DL2}$ respectively delayed 1 H and 2 H behind the input luminance signal $Y_{in}$ for effecting the vertical contour compensation can be obtained with a single 1 H delay line 43, while the insertion loss temperature compensation for the 1 H delay line 43 is obtained throught the AGC function of the variable gain amplifier 44, so that the levels of the delayed luminance signals $Y_{DL1}$ and $Y_{DL2}$ can be automatically controlled to obtain stable regular vertical contour compensation processing.

As has been described in the foregoing, according to the invention two delayed signals delayed by different amounts can be obtained with a simple construction utilizing a single delay line and orthogonal modulation/demodulation means. Also, the orthogonal modulations of signal can be reliably demodulated for steady recovery of the delayed signals through synchronous detection by using the phase controlled carrier from the variable phase shifter as a synchronizing signal.

What is claimed is:

1. A delay circuit comprising:
   oscillator means;
   modulating means for effecting contour modulation of first and second input signals using outputs of said oscillator means as carriers;
   delaying means for delaying a modulation output of said modulating means
   variable phase shifting means for phase shifting said carriers;
   demodulating means for effecting demodulation of the delayed modulation output by synchronous detection using the phase shifted carriers as synchronizing signals;
   adding means for superimposing a reference signal on a first demodulated from said demodulating means correponding to said first input signal to said modulating means and supplying the resultant signal as said second input signal to said modulating means; and
   control means for controlling the amount of phase shift by said variable phase shifting means according to the reference signal included in a second demodulated signal demodulated by said demodulating means;
   said first demodulated signal being delayed behind said first input signal supplied to said modulating means by an amount provided by said delaying means and said second demodulated signal being delayed behind said first input signal by double said amount.

2. The delay circuit according to claim 1, further comprising a gain controlled amplifier with the gain thereof controlled according to the output of said demodulating means, the delayed modulating output from said delaying means being supplied to said demodulating means through said gain controlled amplifier.

3. The delay circuit according to claim 2, wherein the gain of said gain controlled amplifier is controlled according to said reference signal included in said second demodulated signal.

4. A delay circuit comprising:
   oscillator means;
   first modulating means for effecting contour modulation of an input video signal using an output of said oscillator means as a first carrier for providing a first modulated signal;
   delaying means for delaying said first modulated signal;
   variable phase shifting means for phase shifting said output of said oscillator means;
   first demodulating means receiving the output of said variable phase shifting means as a synchronizing signal and effecting demodulation of the delayed first modulated signal to provide a first demodulated signal;
   second modulating means for effecting contour modulation of a second input signal using said output of said oscillator means, phase shifted relative to said first carrier, as a second carrier;
   adding means for superimposing a reference signal on said first demodulating signal and supplying the resultant signal as said second input signal to said second modulating means for providing a second modulated signal from the latter;
   means for also applying said second modulated signal to said delaying means;
   second demodulating means receiving the output of said variable phase shifting means, phase shifted similarly to said second carrier, as a synchronizing signal and effecting demodulation of the delayed second modulated signal to provide a second demodulated signal;
   control means for controlling the amount of phase shift by said variable phase shifting means according to the reference signal demodulated by said second demodulating means; and
   said delay circuit producing a first demodulating signal delayed behind said input video signal by an amount provided by said delaying means and a second demodulated signal delayed behind said input video signal by double the amount provided by said same delaying means.

5. The delay circuit according to claim 4; further comprising:
   gain controlled amplifier means through which said delayed signal from said delaying means are supplied to said first and second demodulating means; and
   means for controlling the gain of said controlled amplifier means including detecting means for detection of said reference signal, which is part of the output of said second demodulating means.

6. The delay circuit according to claim 4; in which said variable phase shifting means is voltage controlled; and
   said control means includes clamp means receiving said first demodulated signal, sample/hold means sampling an output of said clamp means, and level comparator means comparing a voltage from said sample/hold means with a reference voltage to provide a comparison voltage by which said variable phase shifting means is controlled.

* * * * *